United States Patent
Ho et al.

(10) Patent No.: US 6,911,749 B1
(45) Date of Patent: Jun. 28, 2005

(54) SPINDLE MOTOR STRUCTURE

(75) Inventors: Chun-Lung Ho, Hsinchu (TW);
Yi-Cheng Tsao, Hsinchu (TW);
Yu-Feng Chien, Hsinchu (TW)

(73) Assignee: Lite-On It Corp., Taipei (TW)

( * ) Notice: Subject to any disclaimer, the term of this patent is extended or adjusted under 35 U.S.C. 154(b) by 0 days.

(21) Appl. No.: 10/868,784

(22) Filed: Jun. 17, 2004

(51) Int. Cl.$^7$ .............................................. H02K 11/00
(52) U.S. Cl. ...................... 310/67 R; 310/51; 310/90.5; 310/156.12; 310/156.26
(58) Field of Search ........................ 310/156.01–156.84, 310/67 R, 90.5, 90, 51, 254, 266, 268

(56) References Cited

U.S. PATENT DOCUMENTS

| | | | | |
|---|---|---|---|---|
| 3,233,950 A | * | 2/1966 | Baermann .................. | 310/90.5 |
| 3,619,679 A | * | 11/1971 | Carmichael ................. | 310/159 |
| 3,974,406 A | * | 8/1976 | Wehde ...................... | 310/67 R |
| 4,570,093 A | * | 2/1986 | Morii et al. .................. | 310/46 |
| 4,626,727 A | * | 12/1986 | Janson ................... | 310/156.32 |
| 5,040,085 A | * | 8/1991 | Elsasser et al. ........... | 360/98.07 |
| 5,541,460 A | * | 7/1996 | Dunfield et al. ........... | 310/67 R |
| 5,698,915 A | * | 12/1997 | Fukuyama et al. ........ | 310/67 R |
| 5,774,302 A | * | 6/1998 | Elsaesser et al. ......... | 360/98.07 |
| 5,834,868 A | * | 11/1998 | Yoshikawa et al. ........ | 310/67 R |
| 6,291,916 B1 | * | 9/2001 | Huang et al. .............. | 310/90.5 |

* cited by examiner

*Primary Examiner*—Dang Le
(74) *Attorney, Agent, or Firm*—Dennison, Schultz, Dougherty & MacDonald

(57) ABSTRACT

A spindle motor structure includes a rotor, a stator accommodated mainly inside the rotor, and an internal roof magnet located on an inner roof surface of a rotor bell of the rotor. The internal roof magnet further has an inner rim and an outer rim. The inner rim is located projection-wisely within a range of a hollow shaft of the stator. The outer rim is located projection-wisely between an internal peripheral surface of the rotor bell and an inner edge of a coil of the stator. By providing the internal roof magnet inside the rotor bell, a magnetic field to immerse the stator can be generated to damp out possible operational noises and disturbance upon the spindle motor.

1 Claim, 3 Drawing Sheets

SPINDLE MOTOR STRUCTURE

BACKGROUND OF THE INVENTION (1) Field of the Invention

The invention relates to a spindle motor for disk drives, and more particularly to the spindle motor which has an improved magnetic arrangement to enhance the stability of the rotor motion.

(2) Description of the Prior Art

In the computer industry, the DVD/CD disk drive has been widely applied as a media storage/providing device. Further, three major parts of the disk drive are an optical reading/writing head, a spindle motor and a drive chipset, in which the spindle motor is the topic of this invention.

Referring to FIG. 1, a typical spindle motor 1 is shown, in which a left hand side of part 13 has been cross-sectional illustrated so as to reveal the composition of part 16 inside the part 13. As shown, the spindle motor 1 includes two major parts: a rotor 18 and a stator 16. Basically, the spindle motor 1 including both the rotor 18 and the stator 16 is symmetric in structure about a center line CL.

The rotor 18 rotating as a whole includes a spindle 12 as a rotational shaft of the rotor 18, a turntable 11 located symmetrically on top of the spindle 12 for bearing a disk 10, and a rotor bell 13 mounted symmetrically around the spindle 12. The rotor bell 13 providing an internal room 130 for accommodating major portion of the stator 16 further has an inner peripheral surface 133 for mounting a peripheral magnetic ring 14 and an open end 131 for allowing the stator 16 to enter.

The stator 16 includes a hollow shaft 161 having a central hole 160, and a plurality of protruding radial coil arms 162 as top-view shown in FIG. 2. One end (the bottom end) of the hollow shaft 160 is fixed at the printed circuit board 2 as well as a base plate 3 supporting the printed circuit board 2 thereupon, while another end is used to receive the spindle 12 of the rotor 18 and to allow the spindle 12 to spin in the central hole 160. The coil arms 162 of the stator 16 are located inside the rotor bell 13 without any contact with the peripheral magnetic ring 14 as well as any other part of the rotor bell 13. As shown, a coil 164 for generating an electrical field is constructed in a middle section of each coil arm 162.

As shown in FIG. 1, the printed circuit board 2 electrically and structurally connected with the stator 16 is mounted on the base plate 3 and is extended electrically by a flexible print circuit 4.

In application, the rotor 18 rotates about the stator 16.

In the art, it is well known that major concerns in design of the high-speed spindle motor 1 as shown in FIG. 1 are the noise, the lifetime and the precision. For example, a typical spindle motor for a 56× CD-ROM disk drive in the marketplace is usually operated at above 10,000 rpm. Under such a high-speed operation, any run-out or unbalance of the disk 10 carried by the spindle motor 1, caused by whatever reasons, will definitely result in some rotation turbulences or noises to the rotor 18 with respect to the stator 16, from which possible bias in optical tracking and focusing may end in failure of data retrieving or storing between the disk 10 and the optical reading/writing head (not shown in the figure).

In addition, the discrete features of the coil arms 162 of the stator 16 as shown in FIG. 2 will also cause inevitable switch noises to both the rotor 18 and relating electrical signals. Such switch noises will be even worse while meeting a disk run-out.

To improve the aforesaid problems occurred in the disk drive, it is easy to see that major efforts should be made on the spindle motor 1 who operates at high speeds and contributes mainly the dynamic characteristics to the disk drive.

Referring to FIG. 3, an effort to smooth out possible noises or disturbances happened to the rotor 18 is shown to have a top magnetic disk 15 installed within a shaft-top flange 163 of the stator hollow shaft 161. By providing the top magnetic disk 15 to the stator 16, a magnetic field between the top magnetic disk 15 and the inner roof surface 132 of the rotor bell 13, also symmetrically around spindle 12 of the rotor 18, can be established to act as a pseudo spring-and-damper combination for damping possible operation noises, i.e. absorbing unexpected disturbance energy to resume normal operation of the disk drive.

Yet, limited to the dimension and construction location at top of the hollow shaft 161, the top magnetic ring 15 can only provide a pretty local cone-shape magnetic field that effects only at a small area around the spindle 12 and thus that can't react efficiently and effectively to a significant run-out of the disk 10 over the turntable 11 as shown in FIG. 1.

SUMMARY OF THE INVENTION

Accordingly, it is an object of the present invention to provide a spindle motor structure which utilizes an internal roof magnet of the rotor bell to damp out possible operational noises and unexpected disturbances.

The spindle motor structure in accordance with the present invention includes a rotor, a stator, and an internal roof magnet.

The rotor of the present invention includes a rotor bell further having an inner roof surface and a peripheral surface.

The stator of the present invention is mainly accommodated inside the rotor and further has a central hollow shaft and a plurality of radial coil arms protruding outward from the hollow shaft. Each of the coil arms further has a coil for generating an electrical magnetic field, in which the coil defines an inner edge facing the hollow shaft.

The internal roof magnet, as a circular symmetric part with respect to the spindle, is located on the inner roof surface and further has an inner rim and an outer rim, in which the inner rim is fallen or located projection-wisely within a range of the hollow shaft and the outer rim fallen or located projection-wisely between the peripheral surface and the inner edge of the coil.

All these objects are achieved by the spindle motor structure described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a spindle motor structure. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
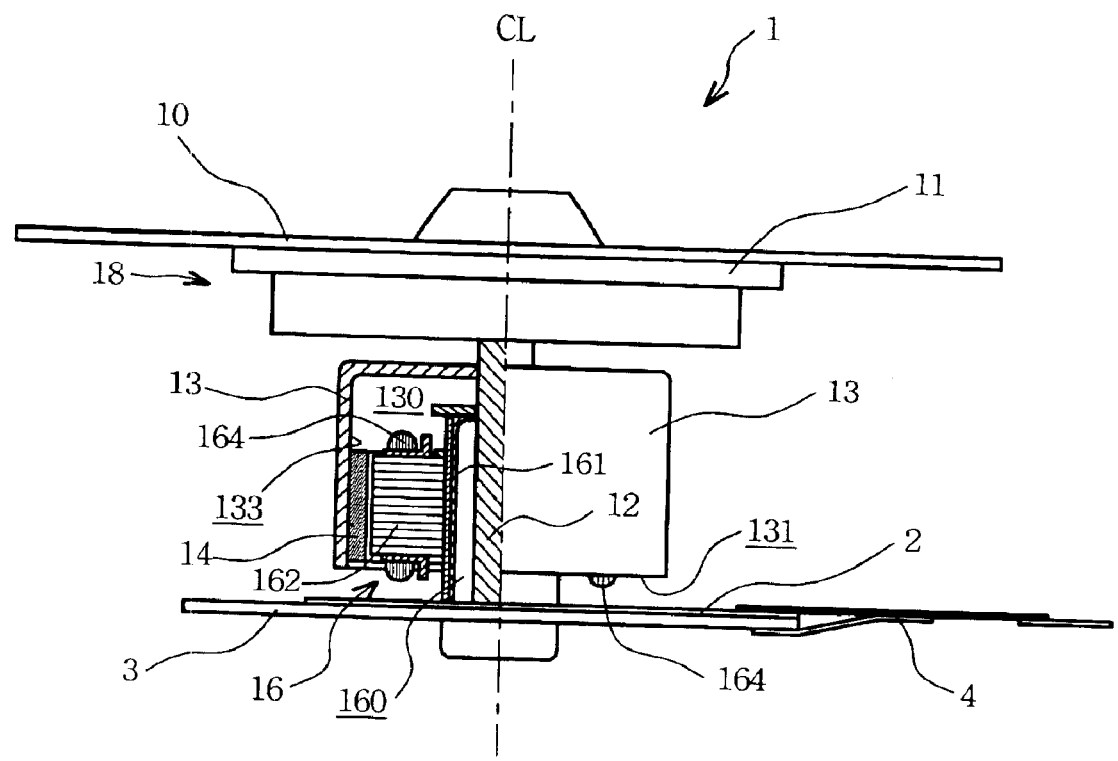
FIG. 1 shows a typical conventional spindle motor, in which a left hand side of a rotor bell has been cross-sectional illustrated so as to reveal the composition of a stator inside the rotor bell.
Figure 4:
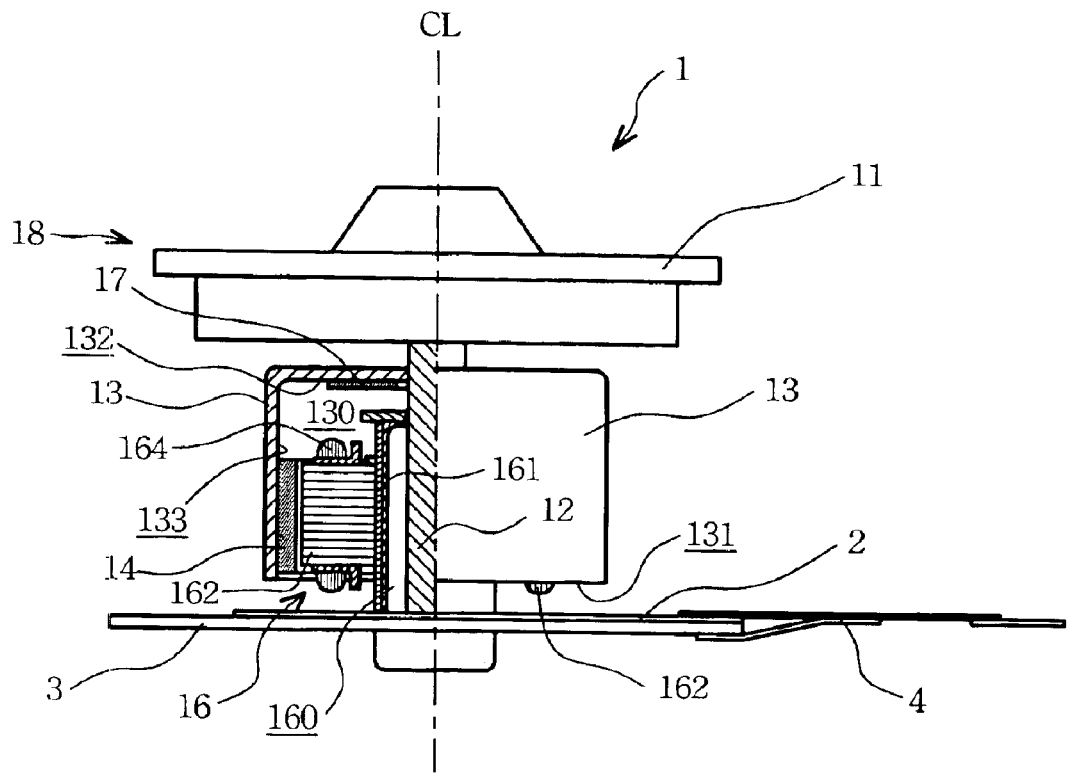
FIG. 4 is a front view of a preferred embodiment of the spindle motor structure in accordance with the present invention, in which a left hand side of a rotor bell has also been cross-sectional illustrated so as to reveal the composition of a stator inside the rotor bell.

Referring now to FIG. 4, a preferred embodiment of the spindle motor structure 1 in accordance with the present invention, in which a left hand side of part 13 has been cross-sectional illustrated so as to reveal the composition of part 16 inside part 13. As shown, the spindle motor structure 1 of the present invention, mainly like the conventional spindle motor of FIG. 1, includes two major parts: a rotor 18 and a stator 16; both of which are constructed symmetrically in structure about a center line CL. Yet, in this invention, an internal roof magnet 17 is included to contribute a magnetic field parallel to the center line and enough to shield the stator 16 for acting as a pseudo spring-and-damper combination for damping possible operation noises and disturbances. It is noted that the internal roof magnet 17 is a circular symmetric part with respect to the center line CL.

The rotor 18 of the present invention is rotated as a whole about the stator 16 and includes a spindle 12 as a rotational shaft of the rotor 18, a turntable 11 located on top of the spindle 12 for bearing a disk, and a rotor bell 13 mounted symmetrically around the spindle 12. The rotor bell 13 providing an internal room 130 for accommodating major portion of the stator 16 further has an inner peripheral surface 133 for mounting a peripheral magnetic ring 14, an inner roof surface 132 for adhering the internal roof magnet 17, and an open end 131 for allowing the stator 16 to enter.

Figure 2:
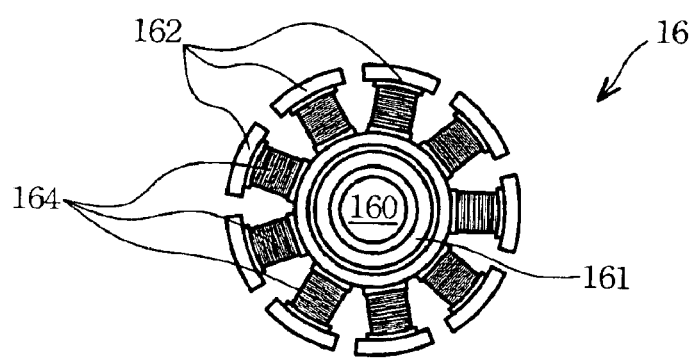
FIG. 2 is a top view of the stator of FIG. 1.

The stator 16 of the present invention includes a hollow shaft 161 having a central hole 160 for receiving and pivoting the spindle 12, and a plurality of protruding radial coil arms 162 as top-view shown in FIG. 2. The coil arms 162 of the stator 16 are located inside the rotor bell 13 without any contact with the internal roof magnet 17, the peripheral magnetic ring 14, and any other part of the rotor bell 13. Each of the coil arms 162 has a middle coil 164 wound for generating an electrical field.

Figure 5:
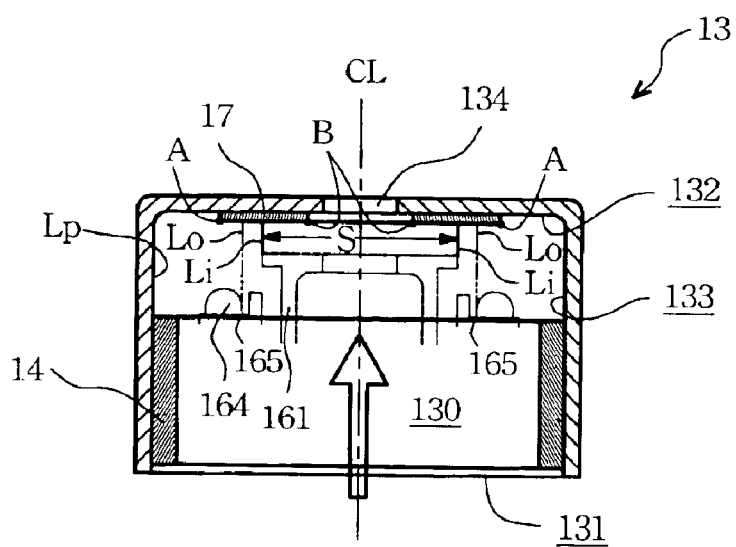
FIG. 5 is a cross-sectional view of the rotor bell of FIG. 5.

Referring now to FIG. 5, a cross-sectional view of the rotor bell 13 of FIG. 4 is illustrated, in which a center top hole 134 of the rotor bell 13 is shown for the spindle 12 to pass through. The internal roof magnet 17 of the present invention, located on the inner roof surface 132 and constructed symmetrically with respect to the center line CL, further has an inner rim B and an outer rim A. The inner rim B is fallen or located projection-wisely (along the arrow direction) within a range S of the hollow shaft 161 (defined by lines Li), and the outer rim A fallen or located projection-wisely between the peripheral surface 133 (line Lp) and the inner edge 165 of the coil 164 (line Lo).

Upon such an arrangement, the internal roof magnet 17 and other parts inside the internal room 130 of the rotor bell 13 can generate a substantial big magnetic field enough for immersing the stator 16 inside the rotor bell 13. In particular, the magnetic field is perpendicular to any electrical magnetic field rendered by the combination of the peripheral magnetic ring 14 and the coil arms 162.

Figure 3:
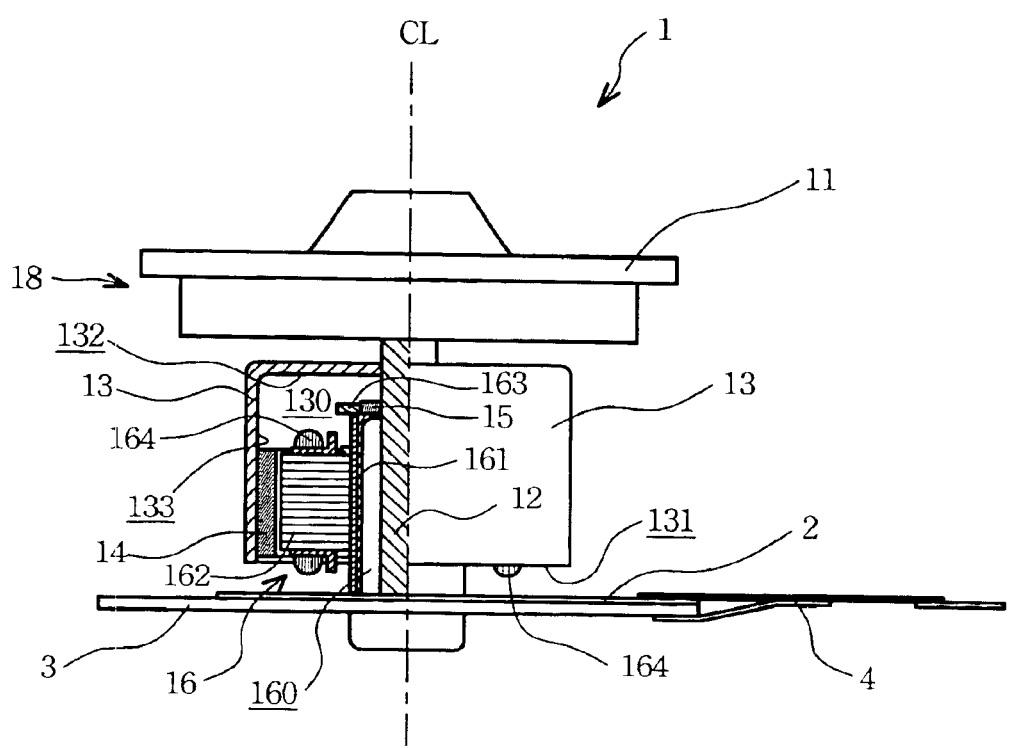
FIG. 3 is a front view of another conventional spindle motor, in which a left hand side of a rotor bell has also been cross-sectional illustrated so as to reveal the composition of a stator inside the rotor bell.

Definitely, effects contributed by inclusion of the internal roof magnet 17 in accordance with the present invention cannot be provided by the top magnetic disk 15 of FIG. 3 who induces only a local magnetic field around the spindle 12 and above the hollow shaft 162.

Therefore, by providing the spindle motor structure having the internal roof magnet to the rotor bell in accordance with the present invention, operational noises and unexpected disturbances to the spindle motor can be effectively damped out, and thereby the performance of the disk drive in optical tracking and focusing can be better assured.

While the present invention has been particularly shown and described with reference to a preferred embodiment, it will be understood by those skilled in the art that various changes in form and detail may be without departing from the spirit and scope of the present invention.

We claim:

1. A spindle motor structure, comprising:

a rotor, wherein said rotor further comprises a rotor bell having an inner roof surface and an inner peripheral surface bounding an internal space;

a stator disposed inside said rotor, said stator comprising a central hollow shaft and a plurality of radial coil arms protruding outward from said hollow shaft, each of said plurality of radial coil arms includes a coil having an inner edge facing said hollow shaft; and, a single internal roof magnet disposed on said inner roof surface of said rotor bell, said single internal roof magnet further includes an inner rim and an outer rim, wherein said single internal roof magnet is dimensioned and configured so that said inner rim is disposed within a range of said hollow shaft, and said outer rim is disposed between said inner peripheral surface and said coil inner edge.

* * * * *